United States Patent [19]

Meynier

[11] Patent Number: 4,923,030
[45] Date of Patent: May 8, 1990

[54] DEVICE FOR GENERATING ACOUSTIC WAVES BY CAUSING A FALLING MASS TO STRIKE A TARGET ELEMENT COUPLED WITH THE WALLS OF A WELL

[75] Inventor: Patrick Meynier, Chatou, France

[73] Assignee: Institut Francais du Petrole, Rueil-Malmaison, France

[21] Appl. No.: 329,328

[22] Filed: Mar. 27, 1989

[30] Foreign Application Priority Data

Mar. 25, 1988 [FR] France ................................ 8804058

[51] Int. Cl.$^5$ ............................................. G01V 1/40
[52] U.S. Cl. ..................................... 181/106; 181/121; 367/911
[58] Field of Search ............................... 181/102–106, 181/119, 401; 367/25, 911, 912; 175/1; 166/206, 212

[56] References Cited

U.S. PATENT DOCUMENTS

| | | | |
|---|---|---|---|
| 4,770,268 | 9/1989 | Magneville | 367/911 X |
| 4,773,501 | 9/1988 | Dedole et al. | 367/911 X |
| 4,796,723 | 1/1989 | Laurent et al. | 181/102 |
| 4,815,557 | 3/1989 | Duwe | 181/106 |

Primary Examiner—Brian S. Steinberger
Attorney, Agent, or Firm—Antonelli, Terry & Wands

[57] ABSTRACT

A device for generating acoustic waves in a well by causing a mass falling inside a body to strike a target element and to transmit impacts to the surrounding geological formations by anchoring the body in the well by retractable shoes. A tractive force exerted on the support cable from the surface, after anchorage of the body, causes a support element to move upwards which takes the target element and the mass with it. When the mass is hydraulically locked in its set position, the cable is slackened so that the target element and the support element can come back to the bottom position. In this position, the support element presses on a pusher element which actuates hydraulic locking and releases the mass.

14 Claims, 3 Drawing Sheets

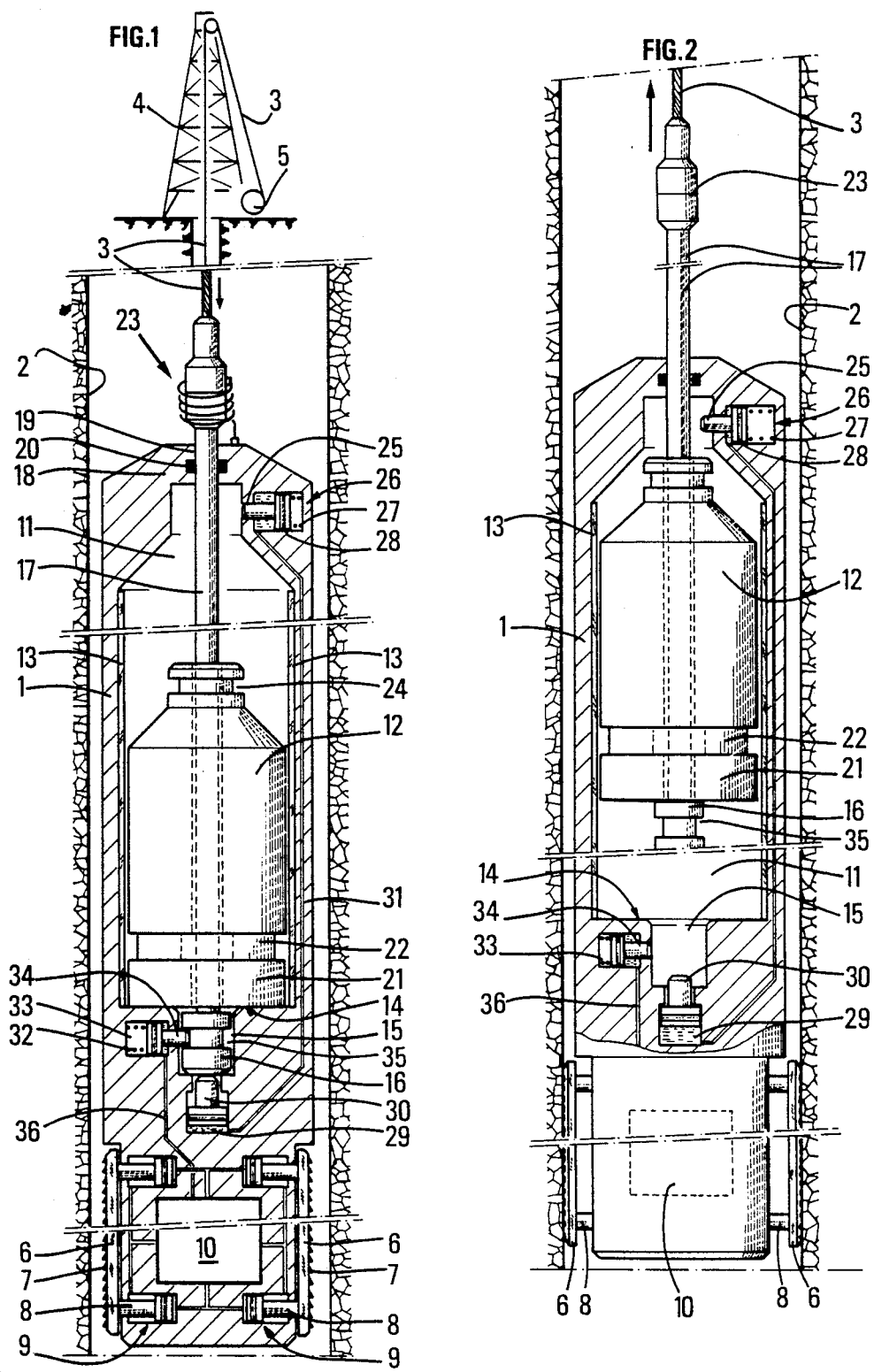

FIG. 3
FIG. 4
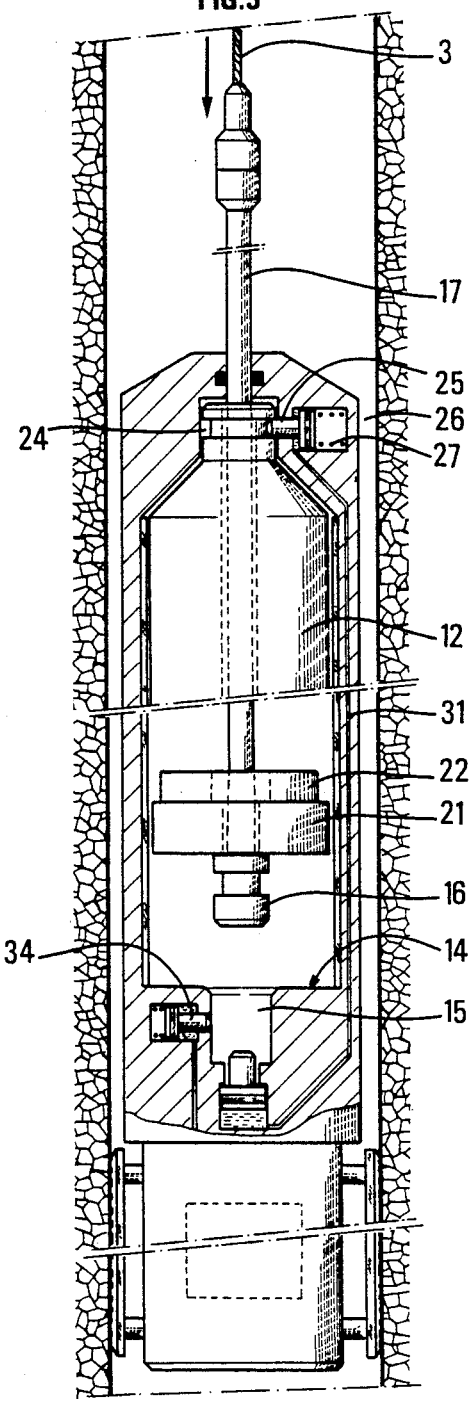
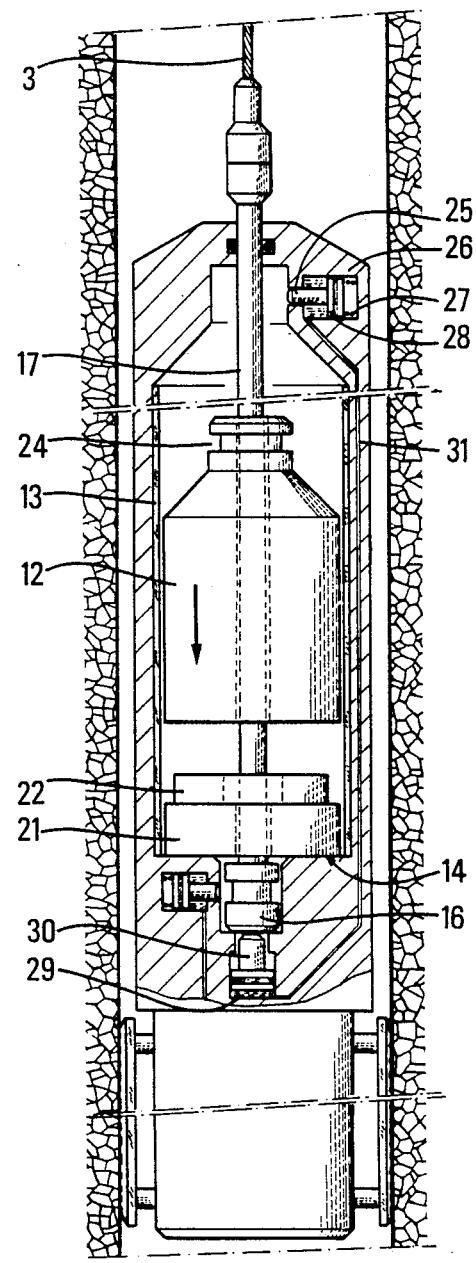

DEVICE FOR GENERATING ACOUSTIC WAVES BY CAUSING A FALLING MASS TO STRIKE A TARGET ELEMENT COUPLED WITH THE WALLS OF A WELL

An improved device for generating acoustic waves by causing a falling mass to strike a target element coupled with the walls of a well.

BACKGROUND OF THE INVENTION

The present invention relates to an improved acoustic wave generating device, adapted for lowering into a well of borehole at the end of a cable for generating acoustic waves by causing a falling mass to strike a target element coupled with the wall of the well.

The acoustic wave generating device of the invention finds its applications particularly in the field of seismic prospection.

A device is known for generating seismic impulses by causing a mass to strike a target element anchored in a borehole. The target element is fixed to an elongated body provided with anchorage means. The mass is movable inside the body between a bottom position in contact with the target element and a top position from where its fall is tripped by control means. The control means comprise an element with retractable hooks adapted for gripping an engagement piece fixed to the mass and rigid traction elements (a drill-pipe or interconnected drill-pipe string) connected to lifting means disposed inside the well. The anchorage means are of the well known packer type and comprise an expandable member formed of a radially movable peripheral portion and a central portion. Expansion is obtained by causing the two portions to rotate with respect to each other by rotating the drill pipe string from the surface. The peripheral portion may be formed of pivoting arms provided with claws which, by opening, anchor themselves in the wall of the well, or else a deformable enclosure.

Such a device is described in the published French patent application 2 590 994. From another published European patent application EP 242262, and corresponding U.S. Pat. No. 4,770,268 another device is known for generating seismic waves in a borehole by causing a mass falling inside an elongated body to strike an anchored target element which is provided with a resetting system which raises the mass from underneath and moves the mass by translation to a tripping position.

This system comprises a threaded rod disposed in the longitudinal axis of the body and a nut locked against rotation which is threaded thereon. The nut is disposed under the mass, and rotation of the rod in a certain direction moves the nut which drives the mass to a top position where the nut is locked in a notch of an engagement bar disposed in the body along a generatrix thereof. By then changing the direction of rotation of the threaded rod, the nut is brought back to a bottom position in which it is moved laterally away from the engagement bar and frees the mass. The threaded rod is driven from the surface by a rigid drill-pipe string or else by an electric motor disposed above the body and fed from the surface by an electric supply and support cable.

The use of a rigid drill-pipe string makes it possible to apply a considerable tractive force and so to reset a well source up to very great depths even in highly deflected wells. But because of the rigid connection existing permanently with the surface, a part of the energy of the shocks produced is transmitted along the well and gives rise to parasitic emissions which disturb somewhat the reception of the useful echos corresponding to the waves transmitted directly to the walls at the anchorage depth of the well source.

Resetting a seismic source using a weight dropping technique by electric motors fed from the surface by an electric supply and support cable such as described in aforementioned European Patent Application 242262; overcomes the drawbacks of a rigid connection. The electric supply and support cable may be slackened before tripping the source, and the energy of the shocks is not transmitted thereby along the well. But the relatively low electric power which the cables generally used in wells may transmit limits the capabilities of such a source. When the dropping height required to obtain powerful impacts is considerable, the time require for resetting is extended, which reduces the possible rate of seismic "shots". If the resetting time intervals are imposed, the dropping height and so the power of the seismic source must necessarily be reduced.

SUMMARY OF THE INVENTION

The improved acoustic wave generating device of the invention overcomes the above drawbacks and is adapted to be lowered into a well at the end of a connecting element, for generating acoustic waves by causing a falling mass to strike a target element coupled with the wall of the well. The acoustic wave generating device comprises a hollow elongated body to which the target element is fixed intermittently with the wall of the well, resetting means comprising a support element disposed under the mass and whose translational movement between a bottom position and a top position raises the mass from its impact position to its resetting position, and retention means movable so as to maintain the mass in a set position.

The acoustic wave generating device comprises a flexible cable for connecting the support element to drive means disposed outside the well, means for locking the support element in the bottom position, a pusher element adapted to be pushed longitudinally when the support element is in the vicinity of its bottom position and means for coupling the movement of the control piston under the thrust of the support element and that of the retention means so as to trip the fall of the mass.

The pusher element actuate a control piston associated with a hydraulic circuit coupled with the retention means or else actuating a switch, which is associated with electric or electromagnetic controlled retention means.

The device may also comprise an intermediate element disposed between the mass and the support element and following the support element in its longitudinal movements, with the intermediate element receiving the impacts of the mass and transmitting the impacts to the body of the device.

With such an arrangement and using electric supply and support cables available commercially, it is possible to exert a force of several tens of kilo-Newtons (kN) which, even taking into account the hydrostatic pressure to be overcome, makes it possible to raise a considerable mass rapidly over several meters.

Thus, a powerful seismic source is obtained capable of operating at a high repetition frequency. In addition, by a transmission to the mass of potential energy being effected by a flexible cable which may be slackened whenever the mass is hoisted to its tripping position, no radiation of parasitic energy occurs along the cable. It may also be noted that, since the support element may be locked in the bottom position in which the seismic source has a minimum size, control thereof during the phases of lowering or raising and also moving along the well are facilitated.

It should be further added that the drive means for moving the source in the well are those generally used for well logging operations. Thus, the use of heavier and more expensive boring equipment is avoided.

BRIEF DESCRIPTION OF THE DRAWINGS

Other features and advantages of the device of the invention will be clear from reading the description of one embodiment given by way of non limitative example, with reference to the accompanying drawings in which:

FIG. 1 is a partially schematic longitudinal cross-sectional view of an acoustic wave generating device of the present invention in a compact position during operations for moving the device along a well;

FIG. 2 is a partial schematic longitudinal cross-sectional view of the device of the present invention anchored in a well when the mass is hoisted to a set position;

FIG. 3 is a partially schematic longitudinal cross-sectional view of the device of the present invention in a set position, with the support element being brought back to a bottom position;

FIG. 4 is a partially schematic longitudinal cross-sectional view of the device of the present invention after tripping, with the mass falling to an impact position.

DESCRIPTION OF THE PREFERRED EMBODIMENTS

Figure 5:
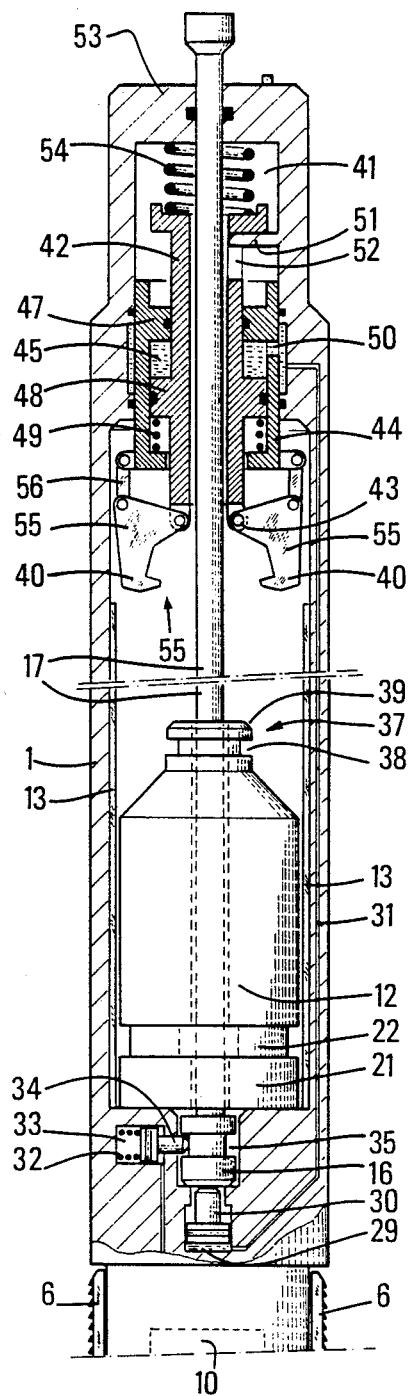
FIG. 5 is a partially schematic longitudinal cross-sectional view of a means for retaining the mass in a top position at the end of a re-setting stroke, with the means comprising shock absorbing elements.

Referring now to the drawings wherein like reference numerals are used throughout the various views to designate like parts and, more particularly, to FIGS. 1 and 4, according to these figures, a device for generating acoustic waves comprises an elongate body 1 adapted to be lowered into a well or borehole 2 at the end of a cable 3 connected to a surface installation. The surface installation comprises a support mast 4 and a cable drum 5 for storing the cable 3 and drive means (not shown) for winding or unwinding the cable and thus moving the generating device in well 2.

A lower part of the body 1 comprises anchorage means formed of several shoes 6 movable from a retracted position (FIG. 1) to an anchorage position (FIG. 2, for example) where the shoes 6 are applied against the wall of the well 2. To improve the coupling of the generating device with the surrounding geological formations, the application faces of the different shoes 6 are provided with projecting elements 7. Four shoes 6 may be used, for example, spaced apart about the body at 90° from each other or else three shoes 6 may be disposed at 120° from each other. Shoes 6 are fixed to rods 8 which are moved radially by hydraulic jacks 9 driven by a hydraulic system (not shown) housed in a cavity 10 of the body. Such a hydraulic system is described, for example, in the published European patent EP 162767 and comprises at least one oleo-pneumatic accumulator charged to a high pressure and electrovalves for distributing the pressurized fluid to the jacks 9 so as to move shoes 6 toward or away from each other.

Electric conductors, not shown so as to simplify the drawings, connect the electrovalve control circuits to electric supply lines running along cable 3. An operator may thus control the motion for moving shoes 6 toward or away from each other.

The generating device comprises an inner chamber 11 in which a mass 12 may slide between a set position (FIG. 3) and an impact position (FIG. 1). Slides 13, disposed along generatrices of body 1, guide the movement of mass 12. An end wall 14 of chamber 11, on the same side as the impact position of the mass 12, comprises an axial recess 15 having appropriate dimensions for completely containing a support element 16. To the support element 16 is fixed a rigid rod 17 of a length greater than a length of the inner chamber 11, which passes through the end wall 18 of the body opposite wall 14, through an opening 19. Seals 20 are disposed in the opening 19 about rod 17 so as to isolate the inner chamber 11 from the well 2. Mass 12 comprises a central recess having a cross-section adapted to that of rod 17 but less than a cross-section of the support element 16. A target element or anvil 21 independent of mass 12 and also with a central recess for the passage of rod 17 is disposed between the mass 12 and the end wall 14.

In order to limit the force of the impacts between mass 12 and the target element 21, a disk is preferably fixed on the target element 21 made from shock absorbing material 22 such, for example, as polyurethane. A connector 23 provides connection of the rod 17 with the cable 3. The use of a target element 21 independent of the body 1 makes it easier to change the target element 21 when damaged by successive impacts.

Mass 12, at its end the closest to the end wall 14, is provided with a groove 24. At the level of groove 24, in the so-called set position of the mass 12, a locking means is disposed which comprises, for example, at least one locking finger 25 movable radially with respect to the body between a first position in which the locking finger 25 is engaged in the groove 24 and retains the mass 12 and a position in which the locking finger 25 is sufficiently retracted to allow the mass 12 to drop.

The locking finger 25 is formed, for example, by the rod of a hydraulic jack 26 housed in the side wall of body 1. A spring 27, bearing against the piston 28 of jack 26, pushes the finger 25 into an extended position. At the bottom of recess 15 opens a cavity 29 for a pusher element or control piston 30. Cavity 29 and the cavity of the hydraulic jack 26, on the side opposite spring 27, communicate through an oil filled duct 31. The pusher element 30 may move from a retracted position (FIG. 1 or FIG. 4 for example) to a more advanced position (FIG. 2 or FIG. 3). This advanced position is defined so that the support element 16, in the vicinity of the lowest position where the support element 16 is entirely engaged in recess 15, presses the pusher element 30 and moves the pusher element 30 sufficiently to cause a concomitant backward movement of the locking finger 25 to release the mass 12. In the cavity 15 there is disposed a locking means for the support element 16 similar to the locking means which retains the mass 12 in the set position. In the rest position, a spring 32 in a housing 33 pushes a locking finger 34 out of the wall of cavity 15 sufficiently for it to engage in a groove 35 of the support element 16. The release of the support element 16 is provided by exerting a hydraulic counter pressure by a circuit 36 communicating with a hydraulic system in the cavity 10. Similarly to the jacks 9 of the anchorage shoes 6, withdrawal of the locking finger 34 is remote controlled by an operator from the surface.

The different remote control signals providing anchorage of the shoes 6 and unlocking of the support element 16 are transmitted through electric conductors of cable 3 as far as the connector 23 where they are connected electrically to a first end of a multi-conductor cable 3 wound in a spiral. At the opposite end of the cable 3, the electric conductors are connected to their conductors (not shown) running along body 1 as far as compartment 10 at the lower portion of the body 1. The length of cable 3 is chosen so as to allow free movement of rod 17.

Purely by way of example, a generating device may comprise a mass 12 of 100 kg or so and a body 1 sufficiently long to allow a drop of the order of 4 meters. The mass 12 is suspended from a support cable of the type generally used for well tools, which exerts, for example, a force of 20 kN and more, which is sufficient for rapidly raising the mass 12 after each drop to 9 reset position. The energy transmitted thus by traction is much greater than the electric power supplied by a cable 3 which is of the order of 1 kw.

In operation, in the position which the mass 12 occupies at the moment of its movements in a well 2 and which is shown in FIG. 1, the support element 16 is at the bottom of recess 15 in abutment against the pusher element 30, the hydraulic counter pressure is released in duct 36 so that the locking finger 34 is engaged in groove 35, and the anchorage shoes 6 are in the retracted position.

At a certain depth of use, the operator on the surface causes the shoes 6 to move apart and to anchor themselves against the wall of the well 2 and then withdrawal of the locking finger 34 through the action of the hydraulic counter pressure so as to release the support element 16.

A tractive force is then exerted on the cable 3 from the surface so as to cause the assembly formed by the support element 16 of the target element 21 with its shock absorbing disk 22 and mass 12 (FIG. 2) to slide upwards. Release of the pusher element 30 causes the locking finger 25 to project out of the wall of the body 1 under the thrust of spring 27.

When the mass 12 has reached its set position (FIG. 3), the locking finger 25 engages in the groove 24 and immobilizes the locking finger 25. The cable 3 is slackened so as to let the support element 16 come back to its bottom position. The target element 21 which accompanies the support element 16 in its movement arrives in contact with the end wall 1' of the body 1.

With the support element 16 completely engaged in recess 15, the support element 16 then comes into abutment against the pusher element 30 which results in retracting the locking finger 25 and releasing the mass 12 (FIG. 4). The mass 12 then drops and strikes the disk 22 of the target element 21, and the acoustic impulse produced at the time of impact is transmitted to the surrounding geological formations through the body 1 and the anchorage shoes 6.

Each to and fro cycle of the support element 16 is sufficient to set off a new seismic shot.

In the embodiment shown in FIG. 5, the mass 12 comprises an engagement head 37 on the side opposite the target element 21, with a circular groove 38 and a truncated cone shaped end wall 39. The means for retaining the mass 12 in the set position comprise at least two hooks 40 disposed symmetrically on each side of the axial rod 17. The hooks may pivot between a closely spaced position in which they are able to engage in the circular groove 38 while locking the mass 12 in the set position, and a spaced apart position where any retention ceases.

The control means for moving the two hooks 40 away from each other and freeing the mass 12 are disposed partially in an axial cavity 41 extending the inner chamber 11. The control means comprise a cylindrical sleeve 42 adapted to slide about rod 11. Hooks 40 may pivot about pins 43 fixed to a first end of the cylindrical sleeve 42. A fixed cylindrical part 44, of a cross-section greater than a cross-section of the sleeve 42, is partially engaged in the axial cavity 41. The cylindrical part 44 is provided with an inner cavity 45. Sleeve 42 passes through the cylindrical part 44 and two openings, formed in the end walls 46 and 47 thereof, provide for its translational guidance.

Sleeve 42 is provided externally with a piston 48 having a cross-section adapted to the inner cross-section of the cylindrical part 44. A spring 49 is disposed between piston 48 and wall 46 on a side of the chamber 11. The opposite part of cavity 45 contains a hydraulic fluid and communicates through a lateral orifice 50 thereof with the duct 31 (cf. FIGS. 1–3).

A key 51, fast with the wall of body 1, is engaged in an axial groove 52 in the sleeve 42 and prevents rotation thereof. Between the end of sleeve 42 and the bottom 53 of cavity 39 is disposed a return spring 54.

The hooks 40 each comprise a bent portion 55 whose end is connected by a link 56 to the fixed cylindrical part 44. The form of hooks 40 is such that piston 48 sliding towards wall 46 causes the hooks 40 to move away from each other. The force required for causing such sliding and at the same time compression of spring 49 is provided by the hydraulic fluid when the fluid is compressed by the retracting movement of the pusher element 30 (cf. FIG. 1) under the thrust of the support element 16 returned to its bottom position.

The operation of the retention means is substantially identical to that of the locking finger 25 in the preceding embodiment. Raising of the mass 12 by a tractive force exerted on the cable 3 releases the pusher element 30 (FIG. 1) and sleeve 42 rises under the thrust of the spring 49, which closes the hooks 40 again. With the mass 12 arriving in the reset position (FIG. 3), the hooks 40 move away from each other so as to engage with the head 37 of the mass 12. Similarly, the pressure exerted on the pusher element 30 by the return of the support element 16 results in causing sleeve 42 to move in translation downwards and open the hooks 40.

If the retraction movement continues beyond the set position of the mass 12, the sleeve 42 is driven to the bottom of cavity 41, which compresses the return spring 54. Thus, the damage which may result by virtue of an application of too great a tractive force on cable 3 (FIG. 1) is avoided.

Without departing from the scope of the invention, the hydraulic circuit transmitting the movement of the pusher element 30 (FIG. 1) to the locking finger 25 retaining the mass 12 or to the sliding sleeve 42 (FIG. 5), may be replaced by any other equivalent means and, more particularly, by a control circuit comprising, for example, electromagnetic means for moving the retention means. Still within the scope of the invention, the sliding sleeve 42 (FIG. 5) may be extended so that in the rest position the sleeve 42 projects with respect to the upper wall of the body 1 and an element may be fixed to the rigid rod 17 capable of bearing on this external extension in the vicinity of the bottom position of the support element 16 and of moving the hooks 40 apart.

What is claimed is:

1. An improved acoustic wave generating device adapted to be lowered into a well at an end of a connecting element, for generating acoustic waves by causing a falling mass to strike a target element coupled with a wall of the well, the device comprising an elongated body including a longitudinally extending inner chamber means for permitting the mass to move between a set position and an impact position, retractable anchorage means for intermittently coupling the target element with the wall of the well, resetting means comprising a support element disposed beneath the mass and being movable in a translatory movement between a bottom position and a top position for causing the mass to be raised from the impact position to the set position, retention means movable for retaining the mass in the set position, a flexible cable means for connecting said support element to drive means disposed outside the well, means for locking said support element in the bottom position, a pusher element adapted to be pushed longitudinally when said support element is in a vicinity of a bottom position, and means for coupling a movement of said pusher element under a thrust of the support element and that of the retention means so as to trip a dropping of the mass.

2. The device as claimed in claim 1, wherein said pusher element actuates a control piston associated with a hydraulic circuit means for coupling with said retention means.

3. The device as claimed in claim 1, wherein said pusher element actuates a switch associated with one of an electric and electromagnetic control retention means.

4. The device as claimed in claim 1, wherein said target element is disposed between said mass and said support element and is adapted to follow the support element in longitudinal movements, said target element being in abutment against an end wall of the inner chamber means in the bottom position of said support element, a recess means being formed in said end wall for containing said support element and the locking means thereof, said pusher element being movable in a cavity at the bottom of said recess means.

5. The device as claimed in claim 4, wherein said target element comprises a disk made from a shock absorbing material on a face disposed opposite the mass.

6. The device as claimed in claim 5, wherein said support element is fixed to a rigid rod connected to the flexible cable means outside the body.

7. The device as claimed in claim 6, wherein said rigid rod is disposed along the axis of the body, and wherein the mass and said target element are provided with a central recess means for enabling a passage of the rigid rod.

8. The device as claimed in claim 1, wherein said means for locking the support element in the bottom position comprises a rigid rod engageable in a lateral groove of the support element under an action of a spring and hydraulic means, controlled through said flexible cable means, for exerting a counter pressure so as to release the rigid rod from said lateral groove.

9. The device as claimed in claim 1, wherein said means for retaining the mass in a set position comprise a member for radially sliding, and means controlled by the pusher element for moving the radially sliding member between an engaged position against the mass and a disengaged position.

10. The device as claimed in claim 1, wherein said means for retaining the mass in a set position comprise pivoting hooks disposed in said inner chamber means and adapted to retaining the mass in a set position, and means for moving said hooks apart and releasing the mass, disposed axially above said set position of the mass.

11. The device as claimed in claim 10, wherein the means for moving said hooks apart comprise an element fixed to the rigid rod and disposed so as to bear on the pusher element when the support element is in a vicinity of its bottom position.

12. The device as claimed in one of the preceding claims, wherein said retractable anchorage means comprise at least one shoe means having a face in contact with the wall of the well, said face is provided with projecting elements engageable with the wall of the well, and hydraulic means for moving said at least one anchorage shoe.

13. The device as claimed in claim 12, wherein a plurality of anchorage shoes are provided and are equiangularly spaced from each other.

14. The device as claimed in claim 11, wherein said support element is fixed to a rigid rod connected to the flexible cable means outside the body.

* * * * *